US011139875B2

(12) United States Patent
Wei

(10) Patent No.: US 11,139,875 B2
(45) Date of Patent: Oct. 5, 2021

(54) ENERGY EFFICIENT CSI MEASUREMENT FOR FD-MIMO

(71) Applicant: QUALCOMM Incorporated, San Diego, CA (US)

(72) Inventor: Chao Wei, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/060,726

(22) PCT Filed: Nov. 7, 2016

(86) PCT No.: PCT/CN2016/104860
§ 371 (c)(1),
(2) Date: Jun. 8, 2018

(87) PCT Pub. No.: WO2017/128800
PCT Pub. Date: Aug. 3, 2017

(65) Prior Publication Data
US 2018/0375560 A1  Dec. 27, 2018

(30) Foreign Application Priority Data
Jan. 28, 2016  (WO) ................ PCT/CN2016/072502

(51) Int. Cl.
H04B 7/06  (2006.01)
H04L 1/00  (2006.01)
(Continued)

(52) U.S. Cl.
CPC ............. *H04B 7/0626* (2013.01); *H04B 7/04* (2013.01); *H04B 7/0452* (2013.01);
(Continued)

(58) Field of Classification Search
CPC .................. H04B 7/0452; H04B 7/04586; H04B 7/0626; H04B 7/0486; H04L 1/0026; H04L 1/20; H04L 5/00; H04L 5/14
See application file for complete search history.

(56) References Cited

U.S. PATENT DOCUMENTS 9,397,816 B2 * 7/2016 Shen ................ H04L 1/0026
9,456,358 B2   9/2016 Chen et al.
(Continued)

FOREIGN PATENT DOCUMENTS

CN  102869105 A  1/2013
CN  103220066 A  7/2013
(Continued)

OTHER PUBLICATIONS

U.S. Appl. No. 62/221,692, filed Sep. 22, 15, Specification section, pp. 1-17. (Year: 2015).*
(Continued)

Primary Examiner — David B Lugo
(74) Attorney, Agent, or Firm — QUALCOMM Incorporated

(57) ABSTRACT

Dynamic reconfiguration of CSI-RS resources for CSI reporting is described for full dimension multiple input, multiple output (FD-MIMO) systems. While a larger number of channel state information (CSI) reference signal (CSI-RS) resources with independent resource configuration are configured and associated with a CSI process, only a subset of resources that are activated by additional signaling are used for CSI measurement and reporting. The set of activated CSI-RS resources may include only a single CSI-RS resource. Both periodic and aperiodic CSI reporting may then be based on the same set of the activated CSI-RS resources. Medium access control (MAC) control elements may be used to provide activation/deactivation of the CSI-RS resources. Additionally, CSI reporting may be based on
(Continued)

both the activated CSI-RS resources and the associated number of antenna ports.

57 Claims, 10 Drawing Sheets

(51) Int. Cl.
  *H04L 5/00* (2006.01)
  *H04L 1/20* (2006.01)
  *H04B 7/04* (2017.01)
  *H04B 7/0456* (2017.01)
  *H04B 7/0452* (2017.01)
  *H04L 5/14* (2006.01)

(52) U.S. Cl.
  CPC ......... *H04B 7/0478* (2013.01); *H04B 7/0486* (2013.01); *H04L 1/0026* (2013.01); *H04L 1/20* (2013.01); *H04L 5/0026* (2013.01); *H04L 5/0048* (2013.01); *H04L 5/0091* (2013.01); *H04L 5/0057* (2013.01); *H04L 5/14* (2013.01)

(56) References Cited

U.S. PATENT DOCUMENTS

| | | | | |
|---|---|---|---|---|
| 9,801,087 | B2* | 10/2017 | Kim | H04B 17/00 |
| 2013/0142156 | A1 | 6/2013 | Mazzarese et al. | |
| 2013/0301447 | A1 | 11/2013 | Gomadam | |
| 2013/0343299 | A1* | 12/2013 | Sayana | H04B 7/0417 370/329 |
| 2014/0029458 | A1 | 1/2014 | Ye | |
| 2014/0161002 | A1* | 6/2014 | Gauvreau | H04L 1/1893 370/280 |
| 2015/0036664 | A1* | 2/2015 | Yuk | H04W 36/30 370/332 |
| 2015/0055518 | A1* | 2/2015 | Park | H04L 5/0048 370/280 |
| 2015/0304995 | A1* | 10/2015 | Yi | H04L 5/0007 370/329 |
| 2016/0029233 | A1* | 1/2016 | Kollar | H04W 24/08 370/252 |
| 2016/0149679 | A1* | 5/2016 | Frenne | H04L 5/005 370/329 |
| 2016/0226649 | A1* | 8/2016 | Papasakellariou | H04L 5/0057 |
| 2017/0033912 | A1* | 2/2017 | Onggosanusi | H04L 5/0048 |
| 2017/0085345 | A1* | 3/2017 | Dinan | H04L 1/0026 |
| 2017/0331535 | A1* | 11/2017 | Wei | H04B 7/0469 |
| 2018/0167121 | A1* | 6/2018 | Hakola | H04B 7/0617 |
| 2018/0278313 | A1* | 9/2018 | Kim | H04B 7/0626 |
| 2018/0351621 | A1* | 12/2018 | Wei | H04B 7/0478 |
| 2019/0116594 | A1 | 4/2019 | Kwak et al. | |

FOREIGN PATENT DOCUMENTS

| | | |
|---|---|---|
| CN | 103220068 A | 7/2013 |
| CN | 103259583 A | 8/2013 |
| CN | 103516464 A | 1/2014 |
| CN | 104662812 A | 5/2015 |
| CN | 104735691 A | 6/2015 |
| EP | 2685755 A1 | 1/2014 |
| EP | 2797353 A1 | 10/2014 |
| WO | 2012149028 A1 | 11/2012 |
| WO | WO-2014028346 A2 | 2/2014 |

OTHER PUBLICATIONS

International Search Report and Written Opinion—PCT/CN2016/072502—ISA/EPO—dated Oct. 12, 2016.
International Search Report and Written Opinion—PCT/CN2016/104860—ISA/EPO—dated Jan. 22, 2017.
ITRI: "On the CSI Reporting for LAA", 3GPP Draft; R1-157446_Final, 3rd Generation Partnership Project (3GPP), Mobile Competence Centre ; 650, Route Des Lucioles ; F-06921 Sophia-Antipolis Cedex ; France, vol. RAN WG1, No. Anaheim, USA; Nov. 15, 2015-Nov. 22, 2015, Nov. 15, 2015 (Nov. 15, 2015), XP051003587, 4 Pages, Retrieved from the Internet: URL:http://www.3gpp.org/ftp/Meetings_3GPP_SYNC/RAN1/Docs/ [retrieved on Nov. 15, 2015].
SAMSUNG: "LAA CSI Reporting", 3GPP Draft; R1-156772_LAA CSI Reporting 3rd Generation Partnership Pioject (3GPP), Mobile Competence Centre ; 650, Route Des Lucioles ; F-06921 Sophia-Antipolis Cedex; France, vol. RAN WG1, No. Anaheim, USA; Nov. 15, 2015-Nov. 22, 2015, Nov. 7, 2015 (Nov. 7, 2015), XP051022496, 4 Pages, Retrieved from the Internet: URL:http://www.3gpp.org/ftp/tsg_ran/WG1_RL1/TSGR1_83/Docs/ [retrieved on Nov. 7, 2015].
Supplementary European Search Report—EP16887672—Search Authority—The Hague—dated Aug. 20, 2019.
LG Electronics: "Beamformed CSI-RS Related Enhancements based on the Identified Approaches", 3GPP Draft, 3GPP TSG RAN WG1 Meeting #82, R1-154274, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015 Aug. 23, 2015, XP051001605, Retrieved from the Internet: URL:http://www.3gpp.org/ftp/Meetings_3GPP_SYNC/RAN1/Docs/ [retrieved on Aug. 23, 2015], 7 pages.

* cited by examiner

ENERGY EFFICIENT CSI MEASUREMENT FOR FD-MIMO

CROSS-REFERENCE TO RELATED APPLICATIONS

This application claims the benefit of an International PCT Patent Application No. PCT/CN2016/072502, entitled, "ENERGY EFFICIENT CSI MEASUREMENT FOR FD-MIMO," filed on Jan. 28, 2016, which is expressly incorporated by reference herein in its entirety.

BACKGROUND

Field

Aspects of the present disclosure relate generally to wireless communication systems, and more particularly, to energy efficient channel state information (CSI) measurement for full-dimensional (FD) multiple input, multiple output (MIMO).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving an identification of a plurality of channel state information (CSI)—reference signal (CSI-RS) resources configured and associated with a CSI process for CSI reporting, receiving a configuration signal identifying a subset of CSI-RS resources of the plurality of CSI-RS resources that are activated for CSI measurement and reporting, wherein the subset of the plurality of the CSI-RS resources includes fewer CSI-RS resources than the plurality of CSI-RS resources, and transmitting a CSI report based on the subset of CSI-RS resources.

In an additional aspect of the disclosure, an apparatus configured for wireless communication includes means for receiving an identification of a plurality of CSI-RS resources configured and associated with a CSI process for CSI reporting, means for receiving a configuration signal identifying a subset of CSI-RS resources of the plurality of CSI-RS resources that are activated for CSI measurement and reporting, wherein the subset of the plurality of the CSI-RS resources includes fewer CSI-RS resources than the plurality of CSI-RS resources, and means for transmitting a CSI report based on the subset of CSI-RS resources.

In an additional aspect of the disclosure, a non-transitory computer-readable medium having program code recorded thereon. The program code further includes code to receive an identification of a plurality of CSI-RS resources configured and associated with a CSI process for CSI reporting, code to receive a configuration signal identifying a subset of CSI-RS resources of the plurality of CSI-RS resources that are activated for CSI measurement and reporting, wherein the subset of the plurality of the CSI-RS resources includes fewer CSI-RS resources than the plurality of CSI-RS resources, and code to transmit a CSI report based on the subset of CSI-RS resources.

In an additional aspect of the disclosure, an apparatus configured for wireless communication is disclosed. The apparatus includes at least one processor, and a memory coupled to the processor. The processor is configured to receive an identification of a plurality of CSI-RS resources configured and associated with a CSI process for CSI reporting, to receive a configuration signal identifying a subset of CSI-RS resources of the plurality of CSI-RS resources that are activated for CSI measurement and reporting, wherein the subset of the plurality of the CSI-RS resources includes fewer CSI-RS resources than the plurality of CSI-RS resources, and to transmit a CSI report based on the subset of CSI-RS resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
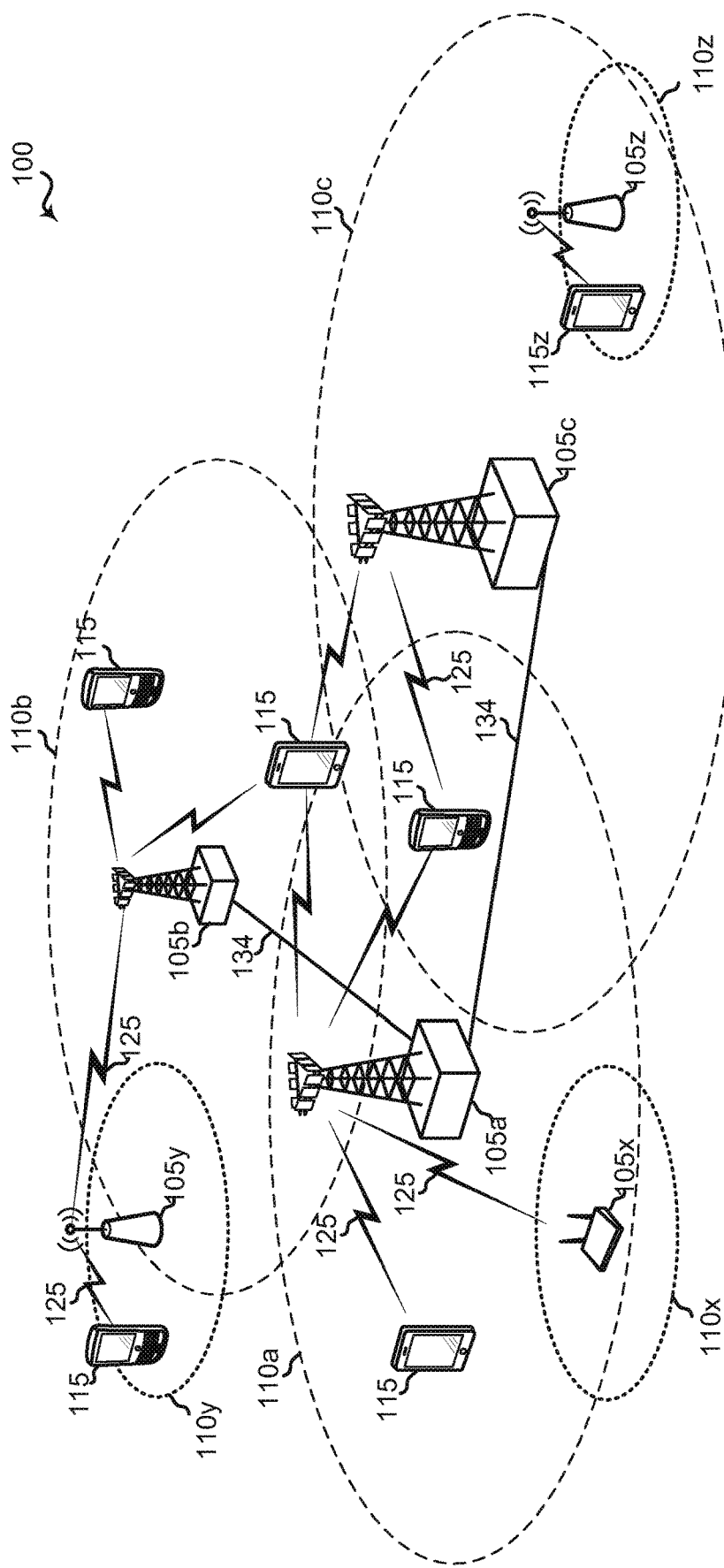
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATS) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may he defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
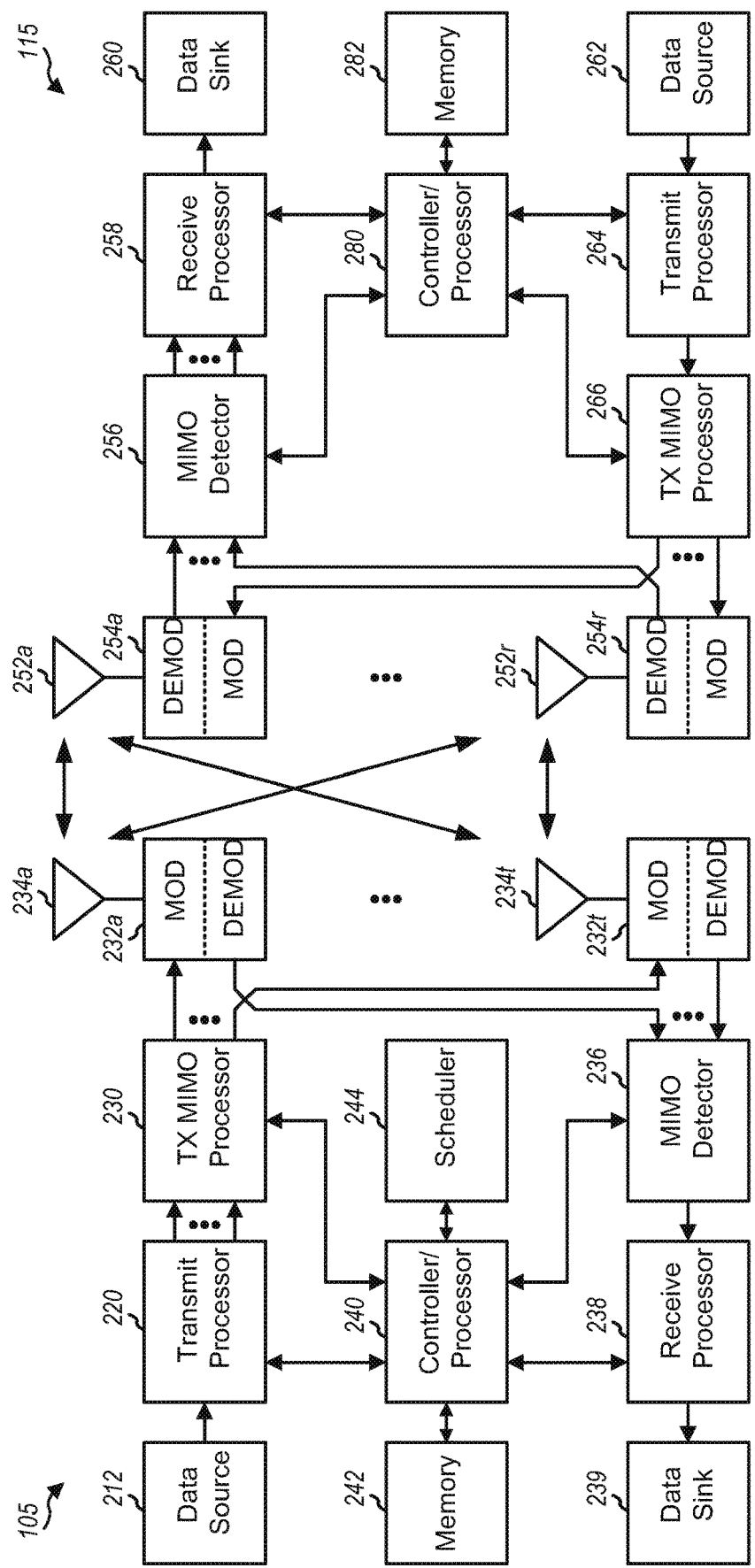
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PERCH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 5A and 5B, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology generally allows communication to take advantage of the spatial dimension through use of channel state information (CSI) feedback at the eNB. An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
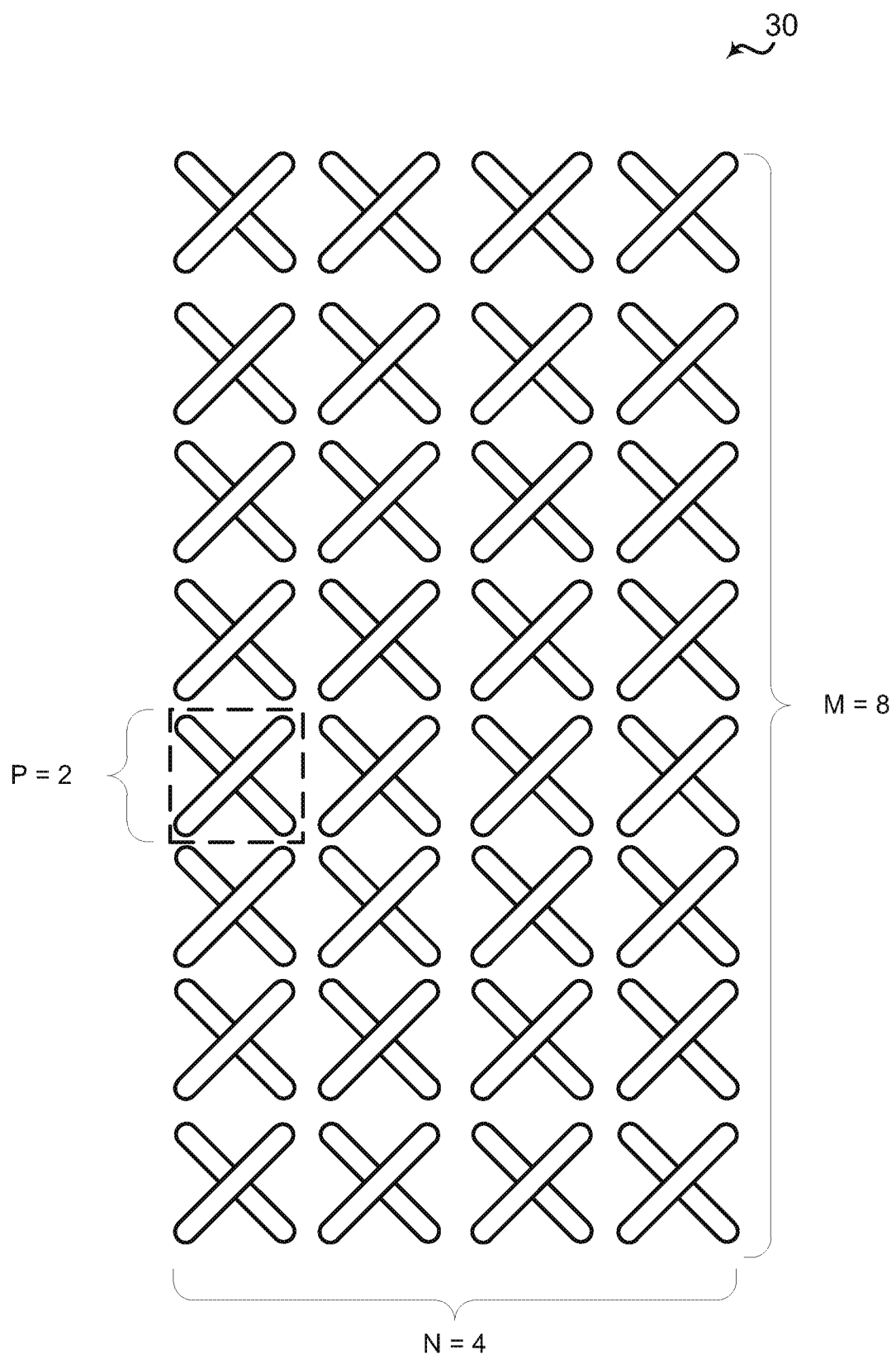
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2).

For a 2D array structure, in order to exploit the vertical dimension by elevation beamforming the CSI is needed at the base station. The CSI, in terms of PMI, RI, and CQI, can be fed back to the base station by a mobile station based on downlink channel estimation and predefined PMI codebook(s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

Figure 4A:
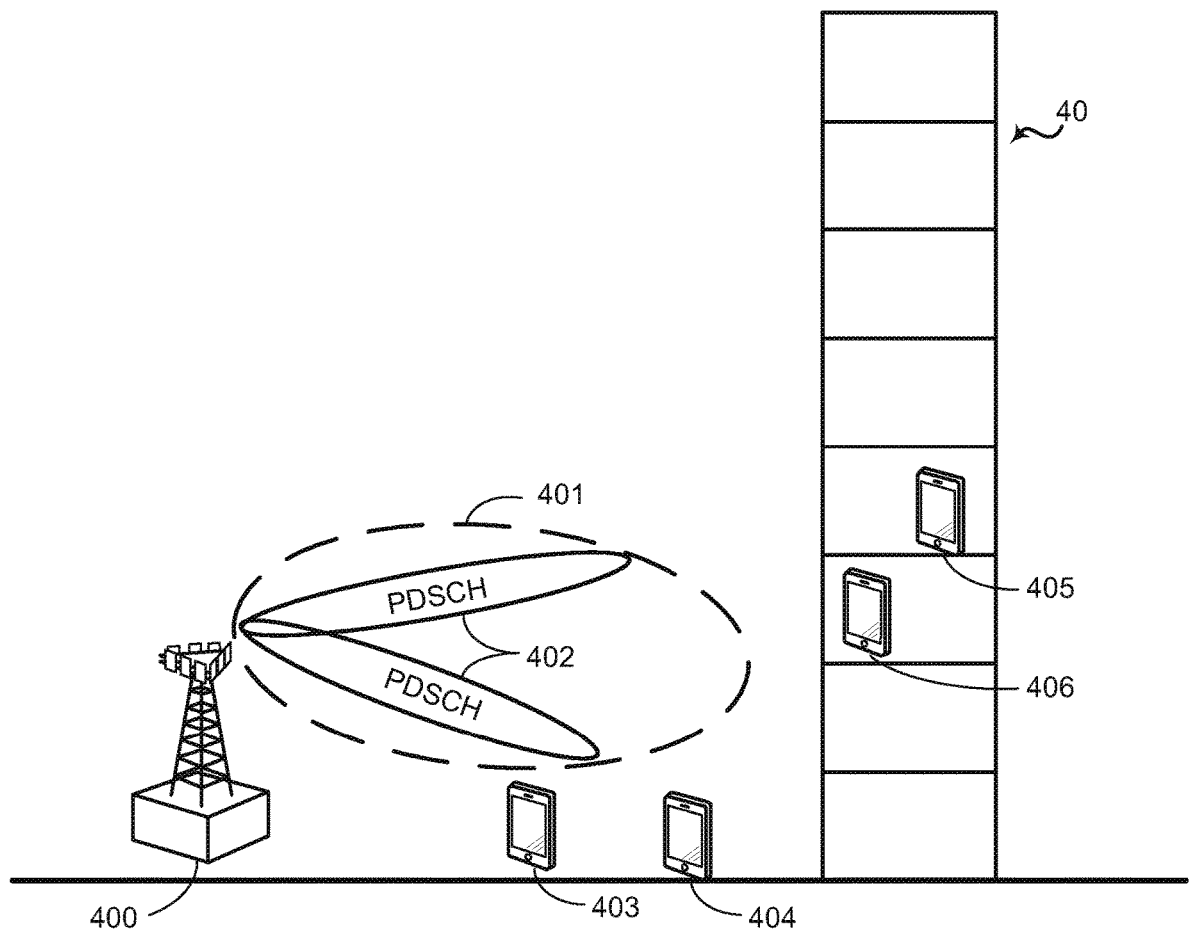
FIG. 4A is a block diagram illustrating an example base station transmitting non-precoded CSI-RS.

For CSI reporting in systems having FD-MIMO, a CSI process may be configured with either of two CSI reporting classes, class A non-precoded or class B beamformed. FIG. 4A is a block diagram illustrating an example base station 400 transmitting non-precoded CSI-RS 401. In class A non-precoded reporting, one non-zero power (NZP) CSI-RS resource per CSI process may be used for channel measurement in which the number of CSI-RS ports may be 8, 12, or 16. Interference measurement in class A reporting may include one CSI-interference measurement (IM) resource per CSI process.

Base station 400 serves UEs 403 and 404 and UEs 405 and 406 in structure 40. 2D CSI-RS ports transmit non-precoded CSI-RS 401 and PDSCH 402 to UEs 403-406. In reporting CSI feedback, UEs 403-406 measure the non-precoded CSI-RS and reports CQI, precoding matrix indicator (PIM) (2D codebook), and rank indicator to base station 400.

Figure 4B:
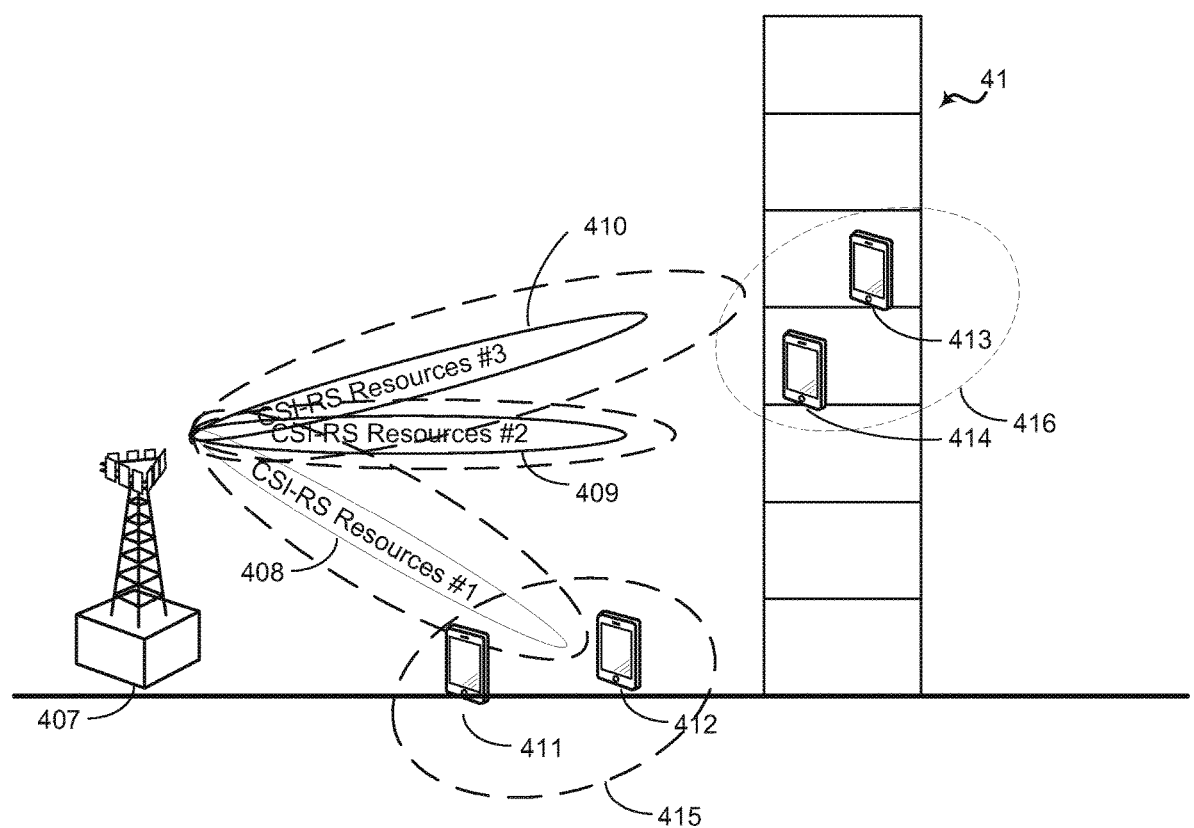
FIG. 4B is a block diagram illustrating an example base station transmitting beamformed CSI-RS using CSI-RS resources.

FIG. 4B is a block diagram illustrating an example base station 407 transmitting beamformed CSI-RS using CSI-RS resources 408-410. CSI-RS resources 408-410 may be directed to serve different UE groups, such as UE group 415, including UEs 411 and 412, and UE group 416, including UEs 413 and 414 in structure 41. Because different CSI-RS resources are used for different UE groups, when providing CSI feedback, UEs 411-414 report CQI, PMI (ID codebook), rank indicator, as well as the CSI-RS resource indicator (CRI), if K>1, which identifies to base station 407 which of the CSI-RS resources the UE has measured and provided channel state information (CSI) feedback for.

In class B beamformed CSI reporting, each CSI process may be associated with K NZP CSI-RS resources/configurations, with $N_k$ ports for the $k^{th}$ CSI-RS resource (K could be ≥1), in which $N_k$ may be 1, 2, 4, or 8, and may be different for each CSI-RS resource. Each CSI-RS resource may also have different CSI-RS port virtualization, e.g., virtualized from different sets of antenna elements or from the same set of antenna elements but with different beamforming weights. Multiple CSI-IM per CSI process is also possible, with one-to-one linkage to each NZP CSI-RS resource.

With an increase in the number of antenna ports, periodic transmission of CSI-RS by the eNB for CSI reporting uses additional energy for transmissions through the additional ports. For class A reporting, the number of CSI-RS ports for CSI reporting will be extended up to 32 port in systems according to later standards releases, such as Release (Rel)-14. For class B reporting, up to 8 CSI-RS resources can be configured for CSI reporting with total number of up to 64 CSI-RS ports. Periodic CSI measurement for a larger number of antenna ports also significantly increases power consumption at the UE. However, periodic CSI provides a more coarse view of channel conditions due to the limited feedback granularity. Thus, only a marginal gain can be expected from a periodic CSI based on a larger number of CSI-RS ports, compared against a significant increase of CSI-RS overhead for handling the larger number of CSI-RS ports. For example, increasing the number of CSI-RS ports from 8 to 64 results in a 6.67% increase in downlink overhead for a 5 ms CSI-RS.

Another issue arises with respect to system robustness for class B beamformed CSI-RS. With more antennas, the CSI-RS beams become narrower. Thus, for fast moving UEs, robust beam tracking becomes more challenging. One way to improve beamforming robustness may be to configure more CSI-RS resources (e.g. K>8) for CSI measurement and reporting. However, this increase could not be supported by all UEs, because UE capability restricts the total number of CSI-RS ports in a CSI process.

Various options have been proposed for handling the issues that arise from use of a larger number of CSI-RS ports. In a first approach, CSI-RS resources are pooled for aperiodic CSI-RS. The pooling of such CSI-RS resources may help to reduce CSI-RS overhead via the dynamic CSI-RS resource sharing with multiple UEs achieved through the pooled resources. In a second approach, CSI-RS resources are independently configured for periodic and aperiodic CSI reporting. This independent configuration of resources can improve energy efficiency, since it enables the eNB to power down the power amplifiers used for aperiodic CSI when there is no data to transmit in the cell. The two approaches may also be combined, for example, to assign periodic CSI-RS resources with longer periodicity and a smaller number of antenna ports for periodic CSI reporting, or aperiodic CSI-RS transmission with a larger number of antenna ports for aperiodic CSI reporting for acquiring accurate CSI.

A number of issues arise with the proposal of using aperiodic CSI-RS for aperiodic CSI reporting. Firstly, additional signaling is required to indicate the time/frequency density/location, port number, transmit power of the aperiodic CSI-RS. If an aperiodic CSI trigger is used to trigger aperiodic CSI-RS transmission, the aperiodic CSI-RS subframe would be located only in between the aperiodic CSI trigger and the aperiodic CSI reporting. However, the measured CSI-RS resource for aperiodic CSI reporting may be transmitted prior to the aperiodic CSI trigger in order to relax CSI processing complexity. Additionally, this proposal would violate the current convention which provides that periodic CSI and aperiodic CSI reporting always refer to the same set of antenna ports and the same set of CSI-RS resources. Thus, potentially changing the antenna ports and CSI-RS resources between periodic and aperiodic CSI reporting would also increase UE complexity.

Various aspects of the present disclosure are directed to a dynamic reconfiguration of CSI-RS resources for CSI reporting. Multiple CSI-RS resources may be configured and associated with a CSI process for CSI reporting for both class A non-precoded CSI-RS and class B beamformed CSI-RS. A number of resources in a CSI process, e.g., K>8 may be possible. $N_k=1/2/4/8/12/16$ or up to 32, where $N_k$ may be different for different k. The configuration may also include time/frequency location, scrambling ID, etc. While K resources are configured, only a subset of the activated resources (e.g., K'<=K) may be used for CSI measurement and reporting. For example, for non-precoded CSI-RS, K' may equal 1, in which only one resource is active for CSI reporting. For beamformed CSI-RS, K' may be less than or equal to 8. In such aspects, both periodic and aperiodic CSI reporting are based on the same set of the activated CSI-RS resources.

Figures 5A, 5B:
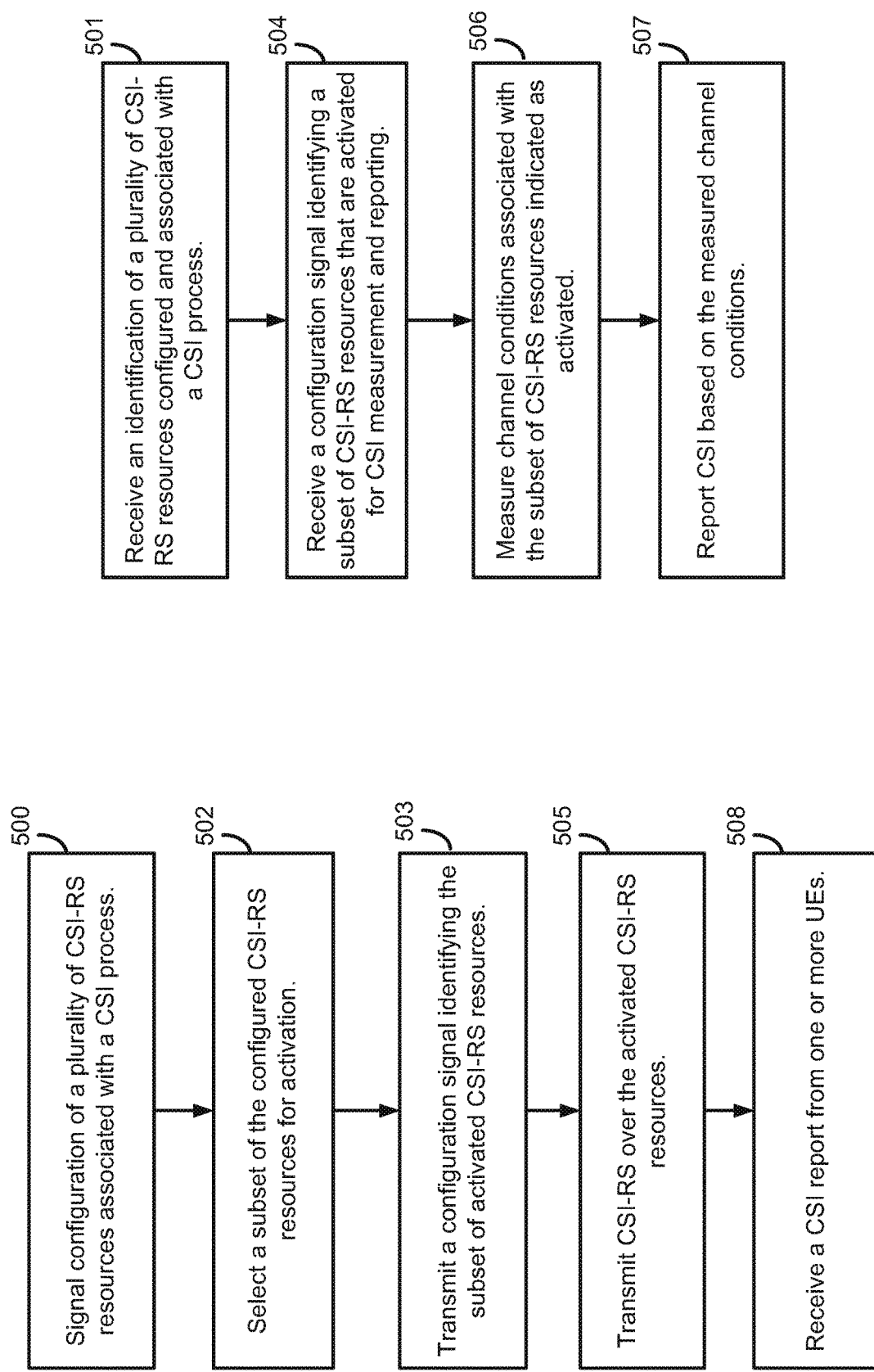
FIGS. 5A and 5B are block diagrams illustrating example blocks executed to implement one aspect of the present disclosure.
Figure 7:
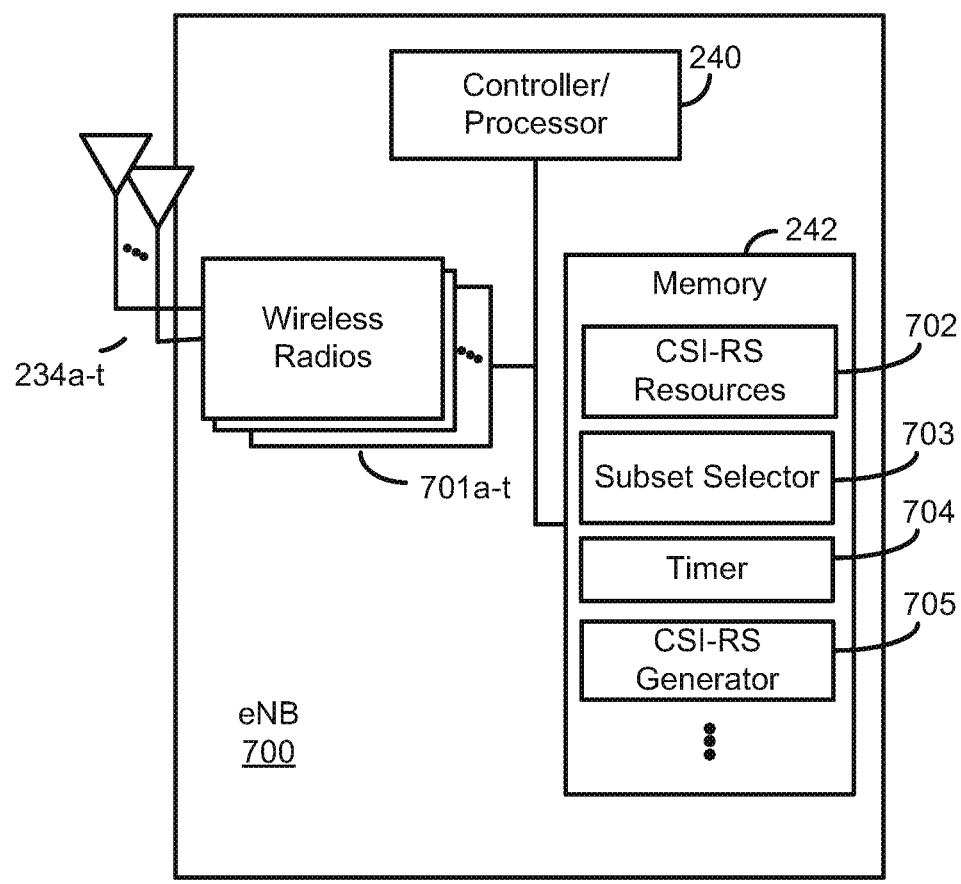
FIG. 7 is a block diagram illustrating an eNB configured according to one aspect of the present disclosure.
Figure 8:
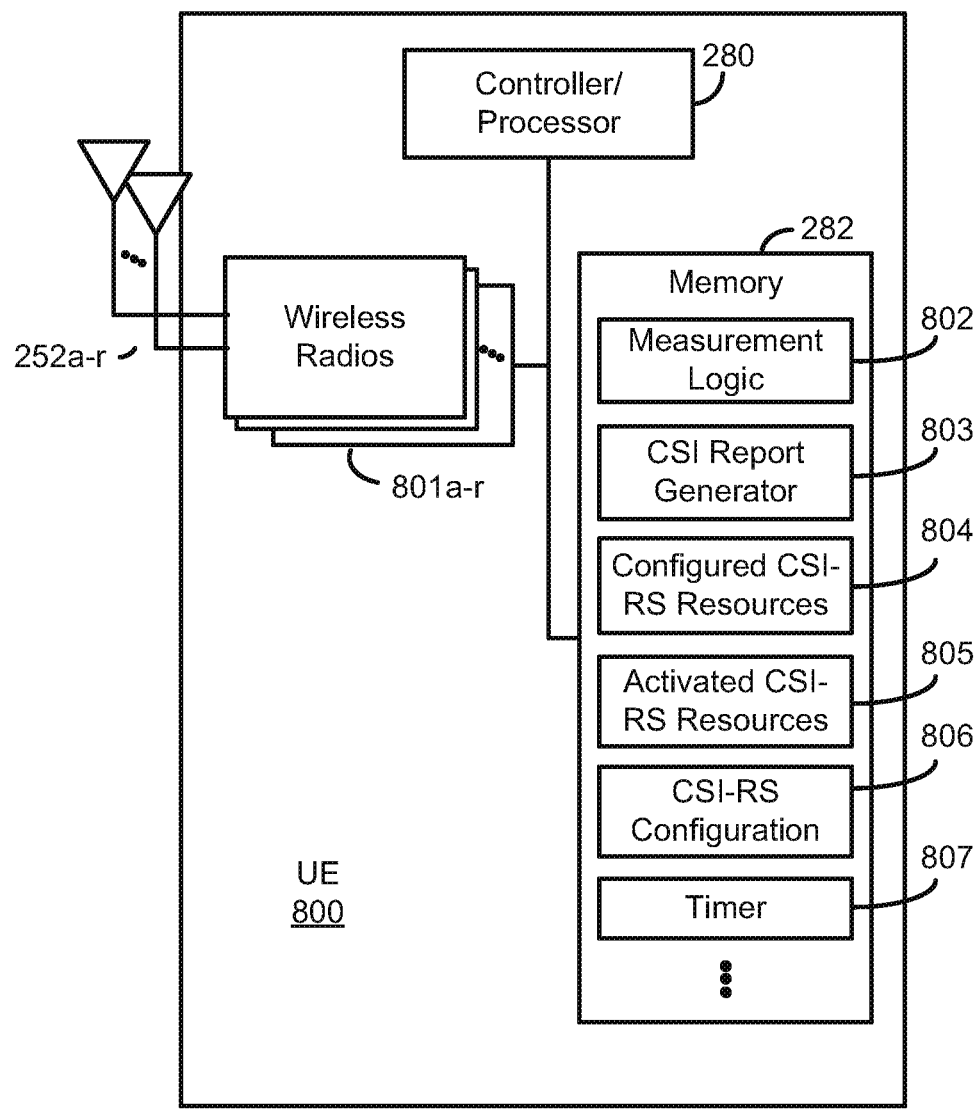
FIG. 8 is a block diagram illustrating a UE configured according to one aspects of the present disclosure.

FIGS. 5A and 5B are block diagrams illustrating example blocks executed to implement one aspect of the present disclosure. The blocks of FIGS. 5A and 5B are also described with respect to FIGS. 7 and 8. FIG. 7 is a block diagram illustrating an eNB 700 configured according to one aspect of the present disclosure. FIG. 8 is a block diagram illustrating a UE 800 configured according to one aspects of the present disclosure. eNB 700 includes various hardware and components, including the hardware, components, and features as described in FIG. 2 with respect to eNB 105. For example, eNB 700 includes controller/processor 240 which controls the hardware and components, and executes the logic stored on memory 242 to implement the operational environment and features of eNB 700. Signals are transmitted and received through antennas 234a-t and wireless radios 701a-t. Wireless radios 701a-t may include components, such as modulator/demodulators 232a-t, MIMO detector 236, receive processor 238, TX MIMO processor 230, and transmit processor 220 (FIG. 2). UE 800 includes various hardware and components, including the hardware, components, and features as described in FIG. 2 with respect to UE 115. For example, UE 800 includes controller/processor 280 which controls the hardware and components, and executes the logic stored on memory 282 to implement the operational environment and features of UE 800. Signals are transmitted and received through antennas 252a-r and wireless radios 801a-r. Wireless radios 801a-r may include components, such as demodulator/modulators 254a-r, MIMO detector 256, receive processor 258, TX MIMO processor 266, and transmit processor 264. The blocks illustrated in FIG. 5A are executed by a base station, such as eNBs 105 and 700, while the blocks illustrated in FIG. 5B are executed by a UE, such as UEs 115 and 800.

At block 500, a base station, such as eNB 700, signals configuration of a plurality of CSI-RS resources associated with a CSI process. For example, eNB 700 configures CSI-RS resources by accessing CSI-RS resources 702 in memory 242. The CSI-RS resources 702 are configured for a particular CSI process. Configuration information is transmitted by eNB 700, under control of controller/processor 240, through wireless radios 701a-t and antennas 234a-t. The configuration parameters may further include information, such as time/frequency location, scrambling identifiers (IDs), number of antenna ports and the like, that will be used by the UE to detect the CSI-RS transmitted from eNB 700.

At block 501, a UE, such as UE 800, receives an identification of the plurality of CSI-RS resources configured and associated with a CSI process. For example, UE 800 receives the configuration information via antennas 252a-r and wireless radios 801a-r, that identifies all of the CSI-RS resources configured and associated with the CSI process. UE 800 will store the CSI-RS resource configuration at configured CSI-RS resources 804 in memory 282.

At block 502, the base station, such as eNB 700, selects a subset of the configured CSI-RS resources for activation. For example, eNB 700, under control of controller/processor 240, executes subset selection control 703, stored in memory 242, which identifies a subset of the configured CSI-RS resources for activation. The subset selected is less than the total number of CSI-RS resources that have been configured for the CSI process. In one aspect, such as for CSI reporting of class A non-precoded CSI-RS, the selected subset may include a single CSI-RS resource. In another aspect, such as for CSI reporting of class B beamformed CSI-RS, the selected subset may include one or more CSI-RS resources, up to a number less than the full number of CSI-RS resources.

At block 503, a base station, such as eNB 700, transmits a configuration signal identifying the subset of CSI-RS resources selected for activation. For example, eNB 700 transmits a configuration, such as an activation/deactivation bitmap signal using wireless radios 701a-t and antennas 234a-t.

At block 504, a UE, such as UE 800, receives the configuration signal identifying the subset of CSI-RS resources that are activated for CSI measurement and reporting. For example, UE 800 receives the configuration signal via antennas 252a-r and wireless radios 801a-r. The configuration signal is then stored in activated CSI-RS resources 805 in memory 282.

At block 505, a base station, such as eNB 700, transmits CSI-RS over the activated CSI-RS resources identified in the configuration signal. For example, under control of controller/processor 240, eNB 700 executes CSI-RS generator 705, stored in memory 242, to generate CSI-RS for transmission through wireless radios 701a-t and antennas 234a-t.

At block 506, a UE, such as UE 800, measures channel conditions associated with the subset of CSI-RS resources indicated as activated. For example, UE 800 also receives the configuration parameters for CSI-RS from eNB 700 via higher layer signaling and stores the parameters in memory 282 at CSI-RS configuration 806. Using the configuration parameters, UE 800, under control of controller/processor 280, tunes wireless radios 801a-r to the appropriate timing and frequency indicated in the configuration parameters to detect the CSI-RS transmitted on the activated CSI-RS resources. UE 800 executes measurement logic 802 to measure the channel quality and conditions of the CSI-RS.

At block 507, a UE, such as UE 800, reports the CSI based on the measured channel conditions. For example, UE 800 uses the measurement results from execution of the measurement logic 802 and executes, under control of controller/processor 280, CSI report generator 803, stored in memory 282. UE 800 transmits the CSI report to eNB 700 using wireless radios 801a-r and antennas 252a-r.

At block 508, a base station, such as eNB 700, receives the CSI report from one or more of the UEs served by eNB 700. For example, eNB 700 receives the CSI report through antennas 234*a-t* and wireless radios 701*a-t*. eNB 700 will then use the CSI report to manage the connection with the associated UE.

As described with respect to FIGS. 5A and 5B, aspects of the present disclosure provide for signaling of activation/deactivation of CSI-RS resources. Activation/deactivation may be executed by means of media access control (MAC) control elements (CEs). For example, when transmitting and receiving the configuration signal in blocks 503 and 504, a MAC CE may be used to activate or deactivate one or more NZP CSI-RS resources as indicated by a K-bit long bitmap in the MAC CE. If activated, the resulting CSI-RS transmission may be based on parameters configured on a higher layer, such as time/frequency location, port number, and the like. A UE may then conduct measurements on all active CSI-RS resources according to existing procedures and requirements. The UE may start reporting CSI based on the measurements of the latest activated CSI-RS resources beginning at subframe n+8, following the reception of the MAC activation/deactivation CE in subframe n. Providing the additional subframes before beginning reporting of the CSI allows an opportunity for the CSI-RS to be transmitted for the newly activated CSI-RS resources.

It should be noted that, when there is no valid CQI available for the latest activated CSI-RS resources for CSI reporting, the UE may report a fixed (out-of-range) value. For example, when there is no CSI-RS transmission instance for the activated CSI-RS resource before the next CSI reporting subframe, the UE may report this fixed value that indicates the CQI report is not associated with an actual measurement.

Alternative aspects of the present disclosure may also provide for deactivation of CSI-RS resources using an automatic deactivation timer. With reference to FIGS. 7 and 8, eNB 700 includes a timer 704 and UE 800 includes a timer 807 which are triggered upon transmission and receipt of the configuration signal identifying the subset of CSI-RS resources. When the timer expires, eNB 700 and UE 800 assume deactivation of the corresponding CSI-RS resource. In one example implementation, such a timer may be effectively disabled by setting the length of the timer to a value of "infinity." When a CSI-RS resource is deactivated or configured but not activated, the associated CSI-RS resources may be released for PDSCH transmission. A UE would not be required to perform CSI measurement for the deactivated CSI-RS.

For each CSI process, at least one CSI-RS resource may be activated for CSI reporting based on either a MAC CE or a predetermined rule. For example, the CSI-RS resource with lowest index may be assumed to be activated before receiving the first MAC activation CE, or, when there is no activated CSI-RS resources, by a MAC activation/deactivation CE. If an NZP CSI-RS resource is activated, the associated CSI-IM resource will also be activated for interference measurement.

Figure 6A:
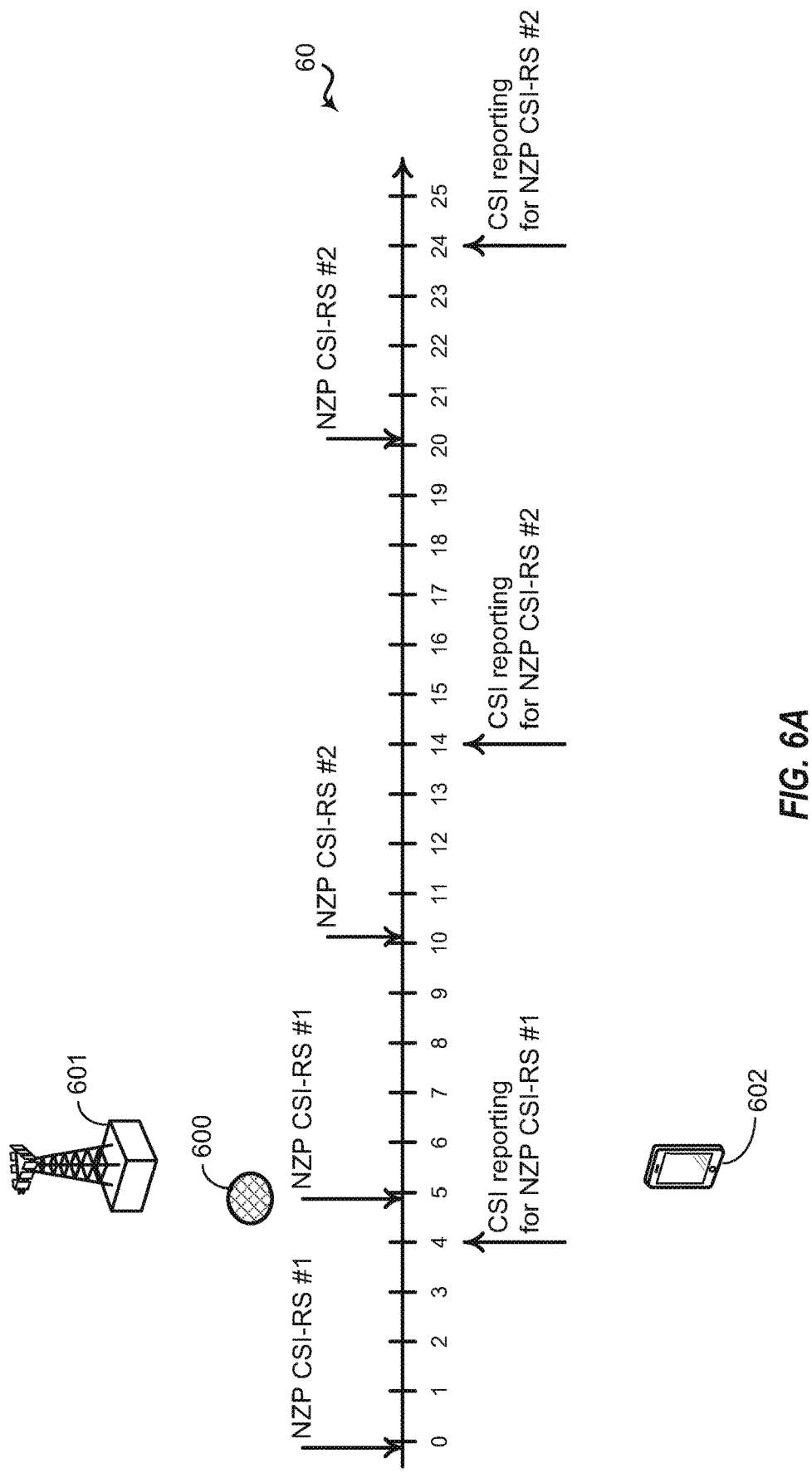
FIGS. 6A and 6B are block diagrams illustrating transmission streams of communications between a base station and a UE configured according to aspects of the present disclosure.

FIG. 6A is a block diagram illustrating a transmission stream 60 of communications between base station 601 and UE 602 configured according to aspects of the present disclosure. Base station 601 may include similar hardware, components, and features to those illustrated with respect to eNBs 105 and 700. Additionally, UE 602 may include similar hardware, components, and features to those illustrated with respect to UEs 115 and 800. Two CSI-RS resources, NZP CSI-RS resource #1 and NZP CSI-RS resource #2 are configured for CSI reporting. Depending on whether the CSI-RS resources are active, base station 601 will transmit CSI-RS for CSI feedback. For example, at subframe 0, base station 601 transmits NZP CSI-RS for NZP CSI-RS resource #1. UE 602 measures the CSI-RS and reports the CSI for NZP CSI-RS #1 at subframe 4. Based on the periodicity of 5 ms for CSI-RS of NZP CSI-RS resource #1, which is signaled to UE 602 via higher layer signaling, base station 601 transmits another CSI-RS for NZP CSI-RS resource #1 at subframe 5 and also transmits an activation/deactivation MAC CE 600 to UE 602 in order to identify the next CSI-RS resource or resources that will be active. Activation/deactivation MAC CE 600 provides for NZP CSI-RS resource #1 to be deactivated and NZP CSI-RS resource #2 to be activated.

Following the reception of activation/deactivation MAC CE 600 by UE 602 in subframe 5, base station 601 ceases transmitting CSI-RS for NZP CSI-RS resource #1 and begins transmitting CSI-RS for NZP CSI-RS resource #2 at subframe 10. Base station 601 will transmit CSI-RS at a periodicity and offset, as configured by higher layer signaling (e.g., a periodicity of 10 ms and a subframe offset of 0, as provided in the illustrated example of FIG. 6A). UE 602 will begin CSI reporting based on measurements of the CSI-RS for NZP CSI-RS resource #2 at subframe 14.

It should be noted that, in another example of operation, if, after the activation/deactivation MAC CE 600, the first CSI-RS for NZP CSI-RS resource #2 begins after the first CQI reporting opportunity at subframe 14, then UE 602 would include the fixed out-of-range value in the CSI reporting on subframe 14. Base station 601 would recognize the out-of-range value in the CSI report from UE 602 as an indication that the CQI is not based on measurement of a CSI-RS.

Figure 6B:
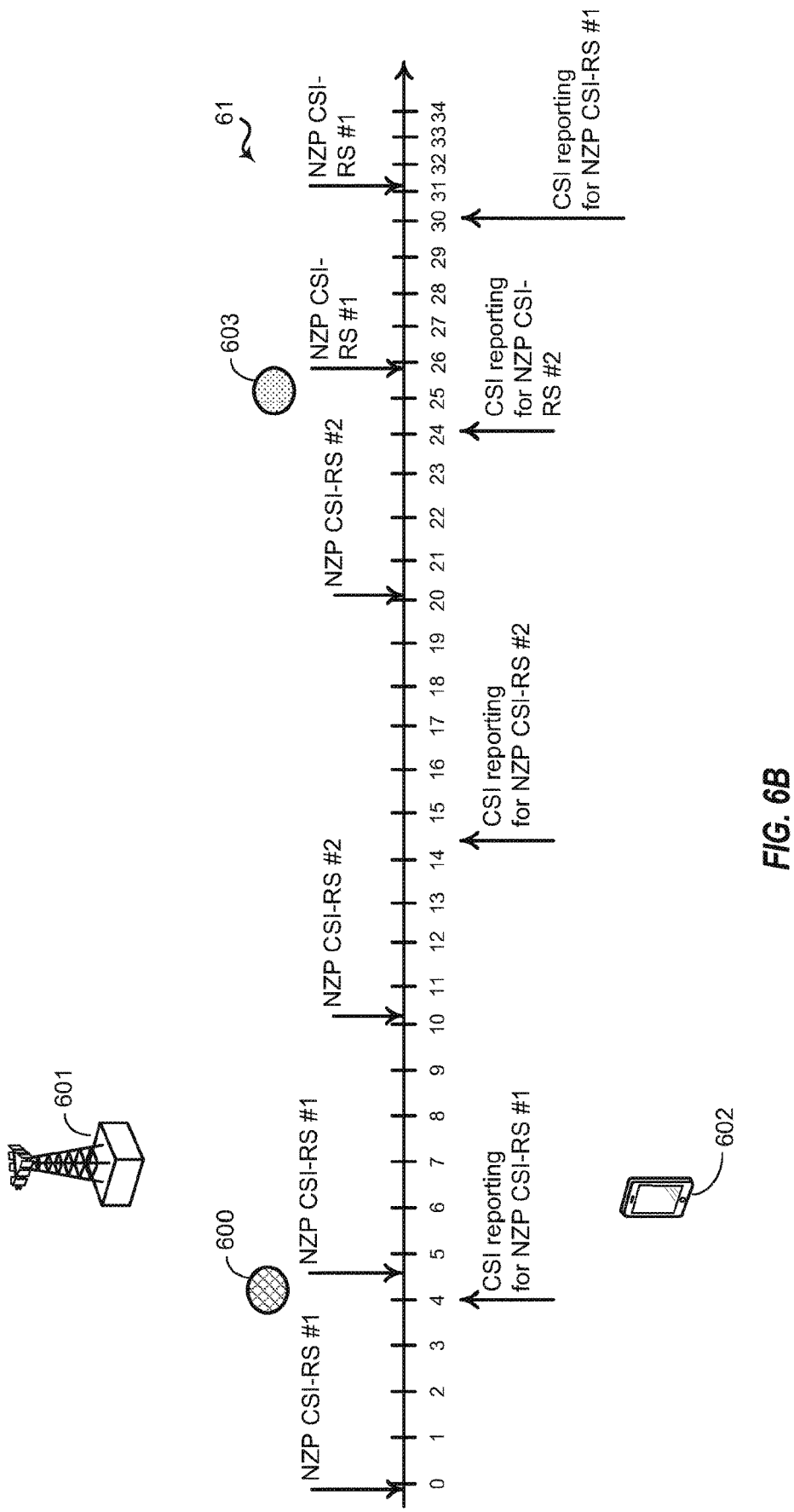

FIG. 6B is a block diagram illustrating a transmission stream 61 of communications between base station 601 and UE 602 configured according to aspects of the present disclosure. Transmission stream 61 includes the communications identified in FIG. 6A and also includes additional subframes of communications between base station 601 and UE 602. Additionally, as illustrated in FIG. 6B, base station 601 and UE 602 operate using deactivation timers. With the deactivation timers within base station 601 and UE 602, base station 601 starts the deactivation timer upon transmission of activation/deactivation MAC CE 600 and UE 602 starts the deactivation timer on receipt of activation/deactivation MAC CE 600. The deactivation timer is configured to expire at subframe 25. At deactivation timer expiration 603, base station 601 stops transmissions of CSI-RS for NZP CSI-RS resource #2, as NZP CSI-RS resource #2 is deactivated. If there is no other activation/deactivation MAC CE transmitted before the deactivation timer expires, base station 601 and UE 602 will then use a predetermined rule to determine a next activated NZP CSI-RS resource. For example, when all CSI-RS resources are deactivated, base station 601 may select the CSI-RS resource having the lowest index for CSI-RS transmission. In the illustrated example, base station 601 would stop CSI-RS for NZP CSI-RS resource #2 and, select NZP CSI-RS resource #1 for CSI-RS transmissions. Base station 601 will, thus, begin transmission of CSI-RS for NZP CSI-RS resource #1 at subframe 26. UE 602 measures the CSI-RS for NZP CSI-RS resource #1 transmitted at subframe 26 and reports the resulting CSI at subframe 30.

Additional aspects of the present disclosure provide for CSI reporting for class A non-precoded CSI-RS with dynamic CSI-RS resources. Only one of the configured CSI-RS resources is activated for class A CSI reporting. In one example aspect, K=4. However, the subset of configured resources selected is identified as 1, K'=1, for class A non-precoded CSI-RS. Due to different $N_k$, CSI reporting types for CSI feedback on PUCCH and CQI/PMI/RI payload may be determined by the $N_k$ of the activated CSI-RS resource.

Additional aspects of the present disclosure also provide for CSI reporting for class B beamformed CSI-RS with dynamic CSI-RS resources. Reporting of a CSI-RS resource indicator (CRI) may also be configured with the bitwidth determined by one of various options. In a first option, the bitwidth may correspond to the number of CSI-RS configured resources in a CSI process, K. In another option, the bitwidth may correspond to the number of activated CSI-RS resources, e.g., K' as opposed to K.

For periodic CSI reporting, the CRT may be reported along with RI in the same subframe according to a predetermined rule. For example, in one aspect, for the same $N_k$ of all the activated CSI-RS resources, RI and CRI are jointly reported using one of the following types based on the $N_k$ and PUCCH reporting mode: jointly reported CRI and RI, jointly reported CRI, RI, and the longterm/wideband codebook (W1), and jointly reporting CRI, RI, and precoding type indicator (PTI). If all of the activated CSI-RS resources do not have the same $N_k$, CRI and RI may be jointly reported independent of the $N_k$ and PUCCH reporting mode. In such aspect, the bitwidth of RI may be determined using the max($N_k$) of all the activated CSI-RS resources.

For aperiodic CSI reporting, the CRI may be reported in the same subframe with RI, PMI, and CQI. If Nk=1 for all of the activated CSI-RS resources, then the PI and PMI report may be omitted. Otherwise, CRI and RI may be jointly encoded with the bitwidth of RI determined using max($N_k$) of all the activated CSI-RS resources.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

The present disclosure comprises a first aspect, such as a non-transitory computer-readable medium having program code recorded thereon, the program code comprising:
program code executable by a computer for causing the computer to receive an identification of a plurality of channel state information (CSI)—reference signal (CSI-RS) resources configured and associated with a CSI process for CSI reporting;
program code executable by the computer for causing the computer to receive a configuration signal identifying a subset of CSI-RS resources of the plurality of CSI-RS resources that are activated for CSI measurement and reporting, wherein the subset of the plurality of the CSI-RS resources includes fewer CSI-RS resources than the plurality of CSI-RS resources; and
program code executable by the computer for causing the computer to transmit a CSI report based on the subset of CSI-RS resources.

Based on the first aspect, the non-transitory computer-readable medium of a second aspect, wherein the identification of the plurality of CSI-RS resources includes identification of at least one of: the periodicity, offset, scrambling identifiers (IDs), and number of antenna ports for each of the plurality of CSI-RS resources.

Based on the first aspect, the non-transitory computer-readable medium of a third aspect, wherein the subset of CSI-RS resources includes a single CSI-RS resource.

Based on the first aspect, the non-transitory computer-readable medium of a fourth aspect, further including:
program code executable by the computer for causing the computer to receive a CSI-RS associated with the subset of CSI-RS resources indicated as activated at an earliest N subframes after receiving the configuration signal, where a value of N is configured by higher layer signaling; and
program code executable by the computer for causing the computer to measure channel conditions associated with the subset of CSI-RS resources indicated as activated; and
program code executable by the computer for causing the computer to generate the CSI report using the measured channel conditions.

Based on the fourth aspect, the non-transitory computer-readable medium of a fifth aspect, wherein the value of N is one of: 4 or 8 and selected according to a set of conditions, wherein the set of conditions includes one of: a total number of antenna ports associated with each of the CSI-RS of the plurality of CSI-RS resources being equal or a size of the subset of CSI-RS resources being fixed.

Based on the first aspect, the non-transitory computer-readable medium of a sixth aspect, further including:
program code executable by the computer for causing the computer to fail to detect a CSI-RS transmission associated with the subset of CSI-RS resources before a CSI reporting opportunity; and
program code executable by the computer for causing the computer to generate the CSI report using a fixed value associated with the failure to detect the CSI-RS transmission.

Based on the first aspect, the non-transitory computer-readable medium of a seventh aspect, wherein the configuration signal includes a medium access control (MAC) control element identifying each of the plurality of CSI-RS resources that are deactivated and each of the plurality of CSI-RS resources of the subset of CSI-RS resources.

Based on the seventh aspect, the non-transitory computer-readable medium of an eighth aspect, wherein the MAC control element includes a K-bit activation bitmap, where K represents a total number of the plurality of CSI-RS resources, wherein the K-bit activation bitmap identifies the each of the plurality of CSI-RS resources that are deactivated and the each of the plurality of CSI-RS resources of the subset of CSI-RS resources.

Based on the eighth aspect, the non-transitory computer-readable medium of a ninth aspect, further including:
program code executable by the computer for causing the computer to start a deactivation timer in response to the receipt of the configuration signal, wherein the deactivation timer counts time until deactivation of the subset of CSI-RS resources.

Based on the ninth aspect, the non-transitory computer-readable medium of a tenth aspect, further including:
program code executable by the computer for causing the computer to deactivate the subset of CSI-RS resources in response to expiration of the deactivation timer; and
program code executable by the computer for causing the computer to reassign one or more of the deactivated subset of CSI-RS resources for downlink shared transmission.

Based on the first aspect, the non-transitory computer-readable medium of an eleventh aspect, further including:
program code executable by the computer for causing the computer to reach a CSI reporting opportunity;
program code executable by the computer for causing the computer to identify that none of the plurality of CSI-RS resources has been indicated as activated;
program code executable by the computer for causing the computer to determine at least one of the plurality of CSI-RS resources is activated based on a predetermined rule;
program code executable by the computer for causing the computer to measure channel conditions associated with the at least one of the plurality of CSI-RS resources; and
program code executable by the computer for causing the computer to generate the CSI report using the measured channel conditions.

Based on the tenth aspect, the non-transitory computer-readable medium of a twelfth aspect, wherein the program code executable by the computer for causing the computer to identify includes one of:
program code executable by the computer for causing the computer to fail to receive a first one of the configuration signal prior to the means for reaching the CSI reporting opportunity;
program code executable by the computer for causing the computer to receive the configuration signal with none of the plurality of CSI-RS resources indicated as activated; or
program code executable by the computer for causing the computer to detect expiration of the deactivation timer for the subset of CSI-RS resources.

Based on the eleventh aspect, the non-transitory computer-readable medium of a thirteenth aspect, wherein the predetermined rule includes one of:
a first CSI-RS resource of the plurality of CSI-RS resources having a lowest index; or
a second CSI-RS resource of the subset of CSI-RS resources having the lowest index of the subset of CSI-RS resources.

Based on the first aspect, the non-transitory computer-readable medium of a fourteenth aspect, wherein a CSI reporting type is for non-precoded CSI-RS resources and the subset of CSI-RS resources includes a single CSI-RS resource, the non-transitory computer-readable medium further including:
program code executable by the computer for causing the computer to determine a CSI payload based on a number of antenna ports associated with the subset of CSI-RS resources.

Based on the first aspect, the non-transitory computer-readable medium of a fifteenth aspect, wherein a CSI reporting type is for beamformed CSI-RS resources and the number of the subset of CSI-RS resources being greater than one, the non-transitory computer-readable medium further including:
program code executable by the computer for causing the computer to determine a bitwidth for reporting a CSI-RS resource indicator (CRI) based on one of:
a number of the plurality of CSI-RS resources; or
a number of the subset of CSI-RS resources.

Based on the fifteenth aspect, the non-transitory computer-readable medium of a sixteenth aspect, further including:
program code executable by the computer for causing the computer to determine a total number of antenna ports associated with each of the CSI-RS resources of the subset of CSI-RS resources for periodic CSI reporting;
program code, executable in response to the total number of antenna ports associated with each of the CSI-RS resources of the subset of CSI-RS resources being equal, executable by the computer for causing the computer to select execution of one of:
program code executable by the computer for causing the computer to jointly report the CRI and a rank indicator in a same subframe;
program code executable by the computer for causing the computer to jointly report the CRI, the rank indicator, and a wideband codebook in the same subframe; or
program code executable by the computer for causing the computer to jointly report the CRI, the rank indicator, and a precoding type indicator in the same subframe,
wherein the program code executable by the computer for causing the computer to select is based on the periodic CSI reporting mode; and
program code, executable in response to the total number of antenna ports associated with each of the CSI-RS resources of the subset of CSI-RS resources being different, executable by the computer for causing the computer to jointly report the CRI and the rank indicator in the same subframe.

Based on the sixteenth aspect, the non-transitory computer-readable medium of a seventeenth aspect, wherein a bitwidth of the rank indicator is determined based on maximum number of antenna ports of the total number of antenna ports associated with each of the CSI-RS resources of the subset of CSI-RS resources.

Based on the fifteenth aspect, the non-transitory computer-readable medium of an eighteenth aspect, further including:
program code executable, by the computer for causing the computer to determine a total number of antenna ports associated with each of the CSI-RS resources of the subset of CSI-RS resources for aperiodic CSI reporting;
program code, executable in response to the total number of antenna ports associated with each of the CSI-RS resources of the subset of CSI-RS resources being equal to one, executable by the computer for causing the computer to jointly report CRI with a channel quality indicator (CQI) in a same subframe; and
program code, executable in response to the total number of antenna ports associated with each of the CSI-RS resources of the subset of CSI-RS resources being greater than one, executable by the computer for causing the computer to jointly report the CRI and CQI with a rank indicator and preceding matrix indicator in the same subframe.

Based on the eighteenth aspect, the non-transitory computer-readable medium of a nineteenth aspect, wherein a bitwidth of the rank indicator is determined based on maximum number of antenna ports of the total number of antenna ports associated with each of the CSI-RS resources of the subset of CSI-RS resources.

A non-transitory computer-readable medium of any combination of claims first through nineteenth, Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving an identification of a plurality of channel state information (CSI)—reference signal (CSI-RS) resources configured and associated with a CSI process for CSI reporting, wherein the configured CSI-RS resources are virtualized from a set of antenna ports;
   receiving a configuration signal identifying a subset of CSI-RS resources of the plurality of CSI-RS resources that are activated for CSI measurement and reporting, wherein the subset of the plurality of the CSI-RS resources includes fewer CSI-RS resources than the plurality of CSI-RS resources;
   releasing one or more CSI-RS resources of the configured CSI-RS resources that are not activated for downlink shared channel;
   determining a set of a total number of antenna ports for the subset of CSI-RS resources, the set of the total number of antenna ports including, for each CSI-RS resource of the CSI-RS resources of the subset of CSI-RS resources for CSI reporting, a total number of antenna ports associated with the CSI-RS resource; and
   transmitting a CSI report based on the subset of CSI-RS resources, wherein transmitting the CSI report includes jointly reporting, based on the set of the total number of antenna ports, a CSI-RS resource indicator (CRI) and a channel quality indicator (CQI) in the same subframe.

2. The method of claim 1, wherein the identification of the plurality of CSI-RS resources includes identification of at least one of: the periodicity, offset, scrambling identifiers (IDs), and number of antenna ports for each of the plurality of CSI-RS resources.

3. The method of claim 1, wherein the subset of CSI-RS resources includes a single CSI-RS resource.

4. The method of claim 1, further including:
receiving a CSI-RS associated with the subset of CSI-RS resources indicated as activated at an earliest N subframes after receiving the configuration signal, where a value of N is configured by higher layer signaling;
measuring channel conditions associated with the subset of CSI-RS resources indicated as activated; and
generating the CSI report using the measured channel conditions.

5. The method of claim 1, further including:
failing to detect a CSI-RS transmission associated with the subset of CSI-RS resources before a CSI reporting opportunity; and
generating the CSI report using a fixed value associated with the failing to detect the CSI-RS transmission.

6. The method of claim 1, wherein the configuration signal includes a medium access control (MAC) control element identifying each of the plurality of CSI-RS resources that are deactivated and each of the plurality of CSI-RS resources of the subset of CSI-RS resources.

7. The method of claim 6, wherein the MAC control element includes a K-bit activation bitmap, where K represents a total number of the plurality of CSI-RS resources, wherein the K-bit activation bitmap identifies the each of the plurality of CSI-RS resources that are deactivated and the each of the plurality of CSI-RS resources of the subset of CSI-RS resources.

8. The method of claim 6, further including:
starting a deactivation timer in response to the receiving the configuration signal, wherein the deactivation timer counts time until deactivation of the subset of CSI-RS resources.

9. The method of claim 8, further including:
deactivating the subset of CSI-RS resources in response to expiration of the deactivation timer; and
reassigning one or more of the deactivated subset of CSI-RS resources for downlink shared transmission.

10. The method of claim 1, further including:
reaching a CSI reporting opportunity;
identifying that none of the plurality of CSI-RS resources has been indicated as activated;
determining at least one of the plurality of CSI-RS resources is activated based on a predetermined rule;
measuring channel conditions associated with the at least one of the plurality of CSI-RS resources; and
generating the CSI report using the measured channel conditions.

11. The method of claim 10, wherein the identifying includes one of:
failing to receive a first one of the configuration signal prior to the reaching the CSI reporting opportunity;
receiving the configuration signal with none of the plurality of CSI-RS resources indicated as activated; or
detecting expiration of a deactivation timer for the subset of CSI-RS resources.

12. The method of claim 10, wherein the predetermined rule includes one of:
a first CSI-RS resource of the plurality of CSI-RS resources having a lowest index; or
a second CSI-RS resource of the subset of CSI-RS resources having the lowest index of the subset of CSI-RS resources.

13. The method of claim 1, wherein a CSI reporting type is for non-precoded CSI-RS resources and the subset of CSI-RS resources includes a single CSI-RS resource, the method further including:
determining a CSI payload based on a number of antenna ports associated with the subset of CSI-RS resources.

14. The method of claim 1, wherein a CSI reporting type is for beamformed CSI-RS resources and the number of the subset of CSI-RS resources being greater than one, the method further including:
determining a bitwidth for reporting the CRI based on one of:
a number of the plurality of CSI-RS resources; or
a number of the subset of CSI-RS resources.

15. The method of claim 1, further including:
in response to each CSI-RS resource of the CSI-RS resources of the subset of the CSI-RS resources having the same total number of antenna portions for the CSI-RS resource, selecting one of:
jointly reporting the CRI and a rank indicator in the same subframe;
jointly reporting the CRI, the rank indicator, and a wideband codebook in the same subframe; or
jointly reporting the CRI, the rank indicator, and a precoding type indicator in the same subframe,
wherein the selecting is based on a periodic CSI reporting mode.

16. The method of claim 15, wherein a bitwidth of the rank indicator is determined based on a maximum number of antenna ports of the set of the total number of antenna ports.

17. The method of claim 1, wherein a bitwidth of the rank indicator is determined based on a maximum number of antenna ports of the set of the total number of antenna ports.

18. The method of claim 1, wherein, in response to each CSI-RS resource of the CSI-RS resources of the subset of the CSI-RS resources having a different total number of antenna portions for the CSI-RS resource, the CRI and the rank indicator are jointly reported in the same subframe.

19. The method of claim 1, further including:
identifying that none of the plurality of CSI-RS resources has been indicated as activated; and
determining at least one of the plurality of CSI-RS resources is activated based on a predetermined rule.

20. The method of claim 1, further including determining whether the total number of antenna ports is equal to one.

21. The method of claim 1, wherein transmitting the CSI report further includes jointly reporting, based on the total number of antenna ports being greater than one, the CRI, the CQI, the rank indicator, and the precoding matrix indicator in the same subframe.

22. The method of claim 1, further including:
in response to each CSI-RS resource of the CSI-RS resources of the subset of the CSI-RS resources having the same total number of antenna portions for the CSI-RS resource, jointly reporting the CRI, the rank indicator, and a wideband codebook in the same subframe.

23. The method of claim 1, further including:
starting a deactivation timer in response to receiving the configuration signal;
deactivating the subset of CSI-RS resources in response to expiration of the deactivation timer;
determining, after deactivating the subset of CSI-RS resources, at least one of the plurality of CSI-RS resources is activated based on a predetermined rule;
measuring channel conditions associated with the at least one of the plurality of CSI-RS resources; and generating a second CSI report using the measured channel conditions.

24. The method of claim 1, wherein the rank indicator and the precoding matrix indicator are omitted from the CSI report based on the total number of antenna ports.

25. The method of claim 24, wherein the rank indicator and the precoding matrix indicator are omitted from the CSI report based on the total number of antenna ports being equal to one.

26. An apparatus configured for wireless communication, comprising:
means for receiving an identification of a plurality of channel state information (CSI)—reference signal (CSI-RS) resources configured and associated with a CSI process for CSI reporting, wherein the configured CSI-RS resources are virtualized from a set of antenna ports;
means for receiving a configuration signal identifying a subset of CSI-RS resources of the plurality of CSI-RS resources that are activated for CSI measurement and reporting, wherein the subset of the plurality of the CSI-RS resources includes fewer CSI-RS resources than the plurality of CSI-RS resources;
means for releasing one or more CSI-RS resources of the configured CSI-RS resources that are not activated for downlink shared channel;
means for determining a set of a total number of antenna ports for the subset of CSI-RS resources, the set of the total number of antenna ports including, for each CSI-RS resource of the CSI-RS resources of the subset of CSI-RS resources for CSI reporting, a total number of antenna ports associated with the CSI-RS resource; and
means for transmitting a CSI report based on the subset of CSI-RS resources, wherein transmitting the CSI report includes jointly reporting, based on the set of the total number of antenna ports, a CSI-RS resource indicator (CRI) and a channel quality indicator (CQI) in the same subframe.

27. The apparatus of claim 26, wherein the identification of the plurality of CSI-RS resources includes identification of at least one of: the periodicity, offset, scrambling identifiers (IDs), and number of antenna ports for each of the plurality of CSI-RS resources.

28. The apparatus of claim 26, wherein the subset of CSI-RS resources includes a single CSI-RS resource.

29. The apparatus of claim 26, further including:
means for receiving a CSI-RS associated with the subset of CSI-RS resources indicated as activated at an earliest N subframes after receiving the configuration signal, where a value of N is configured by higher layer signaling;
means for measuring channel conditions associated with the subset of CSI-RS resources indicated as activated; and
means for generating the CSI report using the measured channel conditions.

30. The apparatus of claim 26, further including:
means for failing to detect a CSI-RS transmission associated with the subset of CSI-RS resources before a CSI reporting opportunity; and
means for generating the CSI report using a fixed value associated with a failure to detect the CSI-RS transmission.

31. The apparatus of claim 26, wherein the configuration signal includes a medium access control (MAC) control element identifying each of the plurality of CSI-RS resources that are deactivated and each of the plurality of CSI-RS resources of the subset of CSI-RS resources.

32. The apparatus of claim 31, wherein the MAC control element includes a K-bit activation bitmap, where K represents a total number of the plurality of CSI-RS resources, wherein the K-bit activation bitmap identifies the each of the plurality of CSI-RS resources that are deactivated and the each of the plurality of CSI-RS resources of the subset of CSI-RS resources.

33. The apparatus of claim 31, further including:
means for starting a deactivation timer in response to receipt of the configuration signal, wherein the deactivation timer counts time until deactivation of the subset of CSI-RS resources;
means for deactivating the subset of CSI-RS resources in response to expiration of the deactivation timer; and
means for reassigning one or more of the deactivated subset of CSI-RS resources for downlink shared transmission.

34. The apparatus of claim 26, further including:
means for reaching a CSI reporting opportunity;
means for identifying that none of the plurality of CSI-RS resources has been indicated as activated;
means for determining at least one of the plurality of CSI-RS resources is activated based on a predetermined rule;
means for measuring channel conditions associated with the at least one of the plurality of CSI-RS resources; and
means for generating the CSI report using the measured channel conditions.

35. The apparatus of claim 34, wherein the means for identifying includes one of:
means for failing to receive a first one of the configuration signal prior to the means for reaching the CSI reporting opportunity;
means for receiving the configuration signal with none of the plurality of CSI-RS resources indicated as activated; or
means for detecting expiration of a deactivation timer for the subset of CSI-RS resources.

36. The apparatus of claim 34, wherein the predetermined rule includes one of:
a first CSI-RS resource of the plurality of CSI-RS resources having a lowest index; or
a second CSI-RS resource of the subset of CSI-RS resources having the lowest index of the subset of CSI-RS resources.

37. The apparatus of claim 26, wherein a CSI reporting type is for non-precoded CSI-RS resources and the subset of CSI-RS resources includes a single CSI-RS resource, the apparatus further including:
means for determining a CSI payload based on a number of antenna ports associated with the subset of CSI-RS resources.

38. The apparatus of claim 26, wherein a CSI reporting type is for beamformed CSI-RS resources and the number of the subset of CSI-RS resources being greater than one, the apparatus further including:
means for determining a bitwidth for reporting the CRI based on one of:
a number of the plurality of CSI-RS resources; or
a number of the subset of CSI-RS resources.

39. The apparatus of claim 26, further including:
means, executable in response to each CSI-RS resource of the CSI-RS resources of the subset of the CSI-RS resources having the same total number of antenna portions for the CSI-RS resource, for selecting one of:
means for jointly reporting the CRI and a rank indicator in the same subframe;
means for jointly reporting the CRI, the rank indicator, and a wideband codebook in the same subframe; or
means for jointly reporting the CRI, the rank indicator, and a precoding type indicator in the same subframe,
wherein the means for selecting is based on a periodic CSI reporting mode; and
means, executable in response to each CSI-RS resource of the CSI-RS resources of the subset of the CSI-RS resources having a different total number of antenna portions for the CSI-RS resource, for jointly reporting the CRI and the rank indicator in the same subframe; and
wherein a bitwidth of the rank indicator is determined based on a maximum number of antenna ports of the set of the total number of antenna ports.

40. The apparatus of claim 26, wherein a bitwidth of the rank indicator is determined based on a maximum number of antenna ports of the set of the total number of antenna ports.

41. An apparatus configured for wireless communication, the apparatus comprising:
at least one processor; and
a memory coupled to the at least one processor,
wherein the at least one processor is configured:
to receive an identification of a plurality of channel state information (CSI)—reference signal (CSI-RS) resources configured and associated with a CSI process for CSI reporting, wherein the configured CSI-RS resources are virtualized from a set of antenna ports;
to receive a configuration signal identifying a subset of CSI-RS resources of the plurality of CSI-RS resources that are activated for CSI measurement and reporting, wherein the subset of the plurality of the CSI-RS resources includes fewer CSI-RS resources than the plurality of CSI-RS resources;
to release one or more CSI-RS resources of the configured CSI-RS resources that are not activated for downlink shared channel;
to determine a set of a total number of antenna ports for the subset of CSI-RS resources, the set of the total number of antenna ports including, for each CSI-RS resource of the CSI-RS resources of the subset of CSI-RS resources for CSI reporting, a total number of antenna ports associated with the CSI-RS resource; and
to transmit a CSI report based on the subset of CSI-RS resources, wherein transmitting the CSI report includes jointly reporting, based on the set of the total number of antenna ports, a CSI-RS resource indicator (CRI) and a channel quality indicator (CQI) in the same subframe.

42. The apparatus of claim 41, wherein the identification of the plurality of CSI-RS resources includes identification of at least one of: the periodicity, offset, scrambling identifiers (IDs), and number of antenna ports for each of the plurality of CSI-RS resources.

43. The apparatus of claim 41, wherein the subset of CSI-RS resources includes a single CSI-RS resource.

44. The apparatus of claim 41, further including configuration of the at least one processor:
to receive a CSI-RS associated with the subset of CSI-RS resources indicated as activated at an earliest N subframes after receiving the configuration signal, where a value of N is configured by higher layer signaling;
to measure channel conditions associated with the subset of CSI-RS resources indicated as activated; and
to generate the CSI report using the measured channel conditions.

45. The apparatus of claim 41, further including configuration of the at least one processor:
to fail to detect a CSI-RS transmission associated with the subset of CSI-RS resources before a CSI reporting opportunity; and
to generate the CSI report using a fixed value associated with a failure to detect the CSI-RS transmission.

46. The apparatus of claim 41, wherein the configuration signal includes a medium access control (MAC) control element identifying each of the plurality of CSI-RS resources that are deactivated and each of the plurality of CSI-RS resources of the subset of CSI-RS resources.

47. The apparatus of claim 46, wherein the MAC control element includes a K-bit activation bitmap, where K represents a total number of the plurality of CSI-RS resources, wherein the K-bit activation bitmap identifies the each of the plurality of CSI-RS resources that are deactivated and the each of the plurality of CSI-RS resources of the subset of CSI-RS resources.

48. The apparatus of claim 46, further including configuration of the at least one processor to start a deactivation timer in response to receipt of the configuration signal, wherein the deactivation timer counts time until deactivation of the subset of CSI-RS resources.

49. The apparatus of claim 48, further including configuration of the at least one processor:
to deactivate the subset of CSI-RS resources in response to expiration of the deactivation timer; and
to reassign one or more of the deactivated subset of CSI-RS resources for downlink shared transmission.

50. The apparatus of claim 41, further including configuration of the at least one processor:
to reach a CSI reporting opportunity;
to identify that none of the plurality of CSI-RS resources has been indicated as activated;
to determine at least one of the plurality of CSI-RS resources is activated based on a predetermined rule;
to measure channel conditions associated with the at least one of the plurality of CSI-RS resources; and
to generate the CSI report using the measured channel conditions.

51. The apparatus of claim 50, wherein the configuration of the at least one processor to identify includes configuration of the at least one processor to one of:
fail to receive a first one of the configuration signal prior to reaching the CSI reporting opportunity;
receive the configuration signal with none of the plurality of CSI-RS resources indicated as activated; or
detect expiration of a deactivation timer for the subset of CSI-RS resources.

52. The apparatus of claim 50, wherein the predetermined rule includes one of:
a first CSI-RS resource of the plurality of CSI-RS resources having a lowest index; or
a second CSI-RS resource of the subset of CSI-RS resources having the lowest index of the subset of CSI-RS resources.

53. The apparatus of claim 41, wherein a CSI reporting type is for non-precoded CSI-RS resources and the subset of CSI-RS resources includes a single CSI-RS resource, the apparatus further including configuration of the at least one processor to determine a CSI payload based on a number of antenna ports associated with the subset of CSI-RS resources.

54. The apparatus of claim 41, wherein a CSI reporting type is for beamformed CSI-RS resources and the number of the subset of CSI-RS resources being greater than one, the apparatus further including configuration of the at least one processor to determine a bitwidth for reporting the CRI based on one of:
   a number of the plurality of CSI-RS resources; or
   a number of the subset of CSI-RS resources.

55. The apparatus of claim 41, further including configuration of the at least one processor:
   to select, in response to each CSI-RS resource of the CSI-RS resources of the subset of the CSI-RS resources having the same total number of antenna portions for the CSI-RS resource configuration of the at least one processor to one of:
      jointly report the CRI and a rank indicator in the same subframe;
      jointly report the CRI, the rank indicator, and a wideband codebook in the same subframe; or
      jointly report the CRI, the rank indicator, and a precoding type indicator in the same subframe,
   wherein the configuration of the at least one processor to select is based on a periodic CSI reporting mode.

56. The apparatus of claim 41, wherein:
   in response to each CSI-RS resource of the CSI-RS resources of the subset of the CSI-RS resources having a different total number of antenna portions for the CSI-RS resource, the CRI and a rank indicator are jointly reported in the same subframe; and
   a bitwidth of the rank indicator is determined based on a maximum number of antenna ports of the set of the total number of antenna ports.

57. The apparatus of claim 41, wherein:
   a bitwidth of the rank indicator is determined based on a maximum number of antenna ports of the set of the total number of antenna ports.

* * * * *